Figure 1:
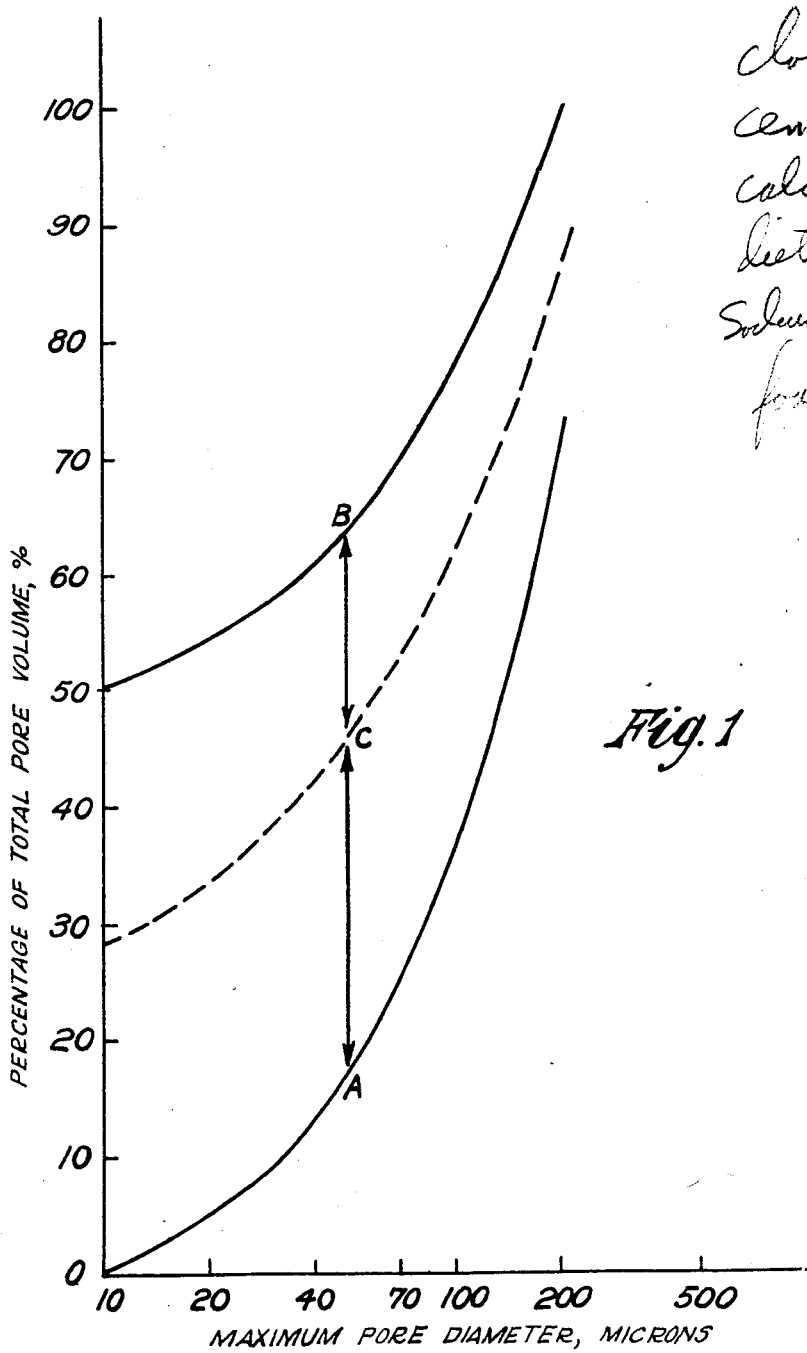

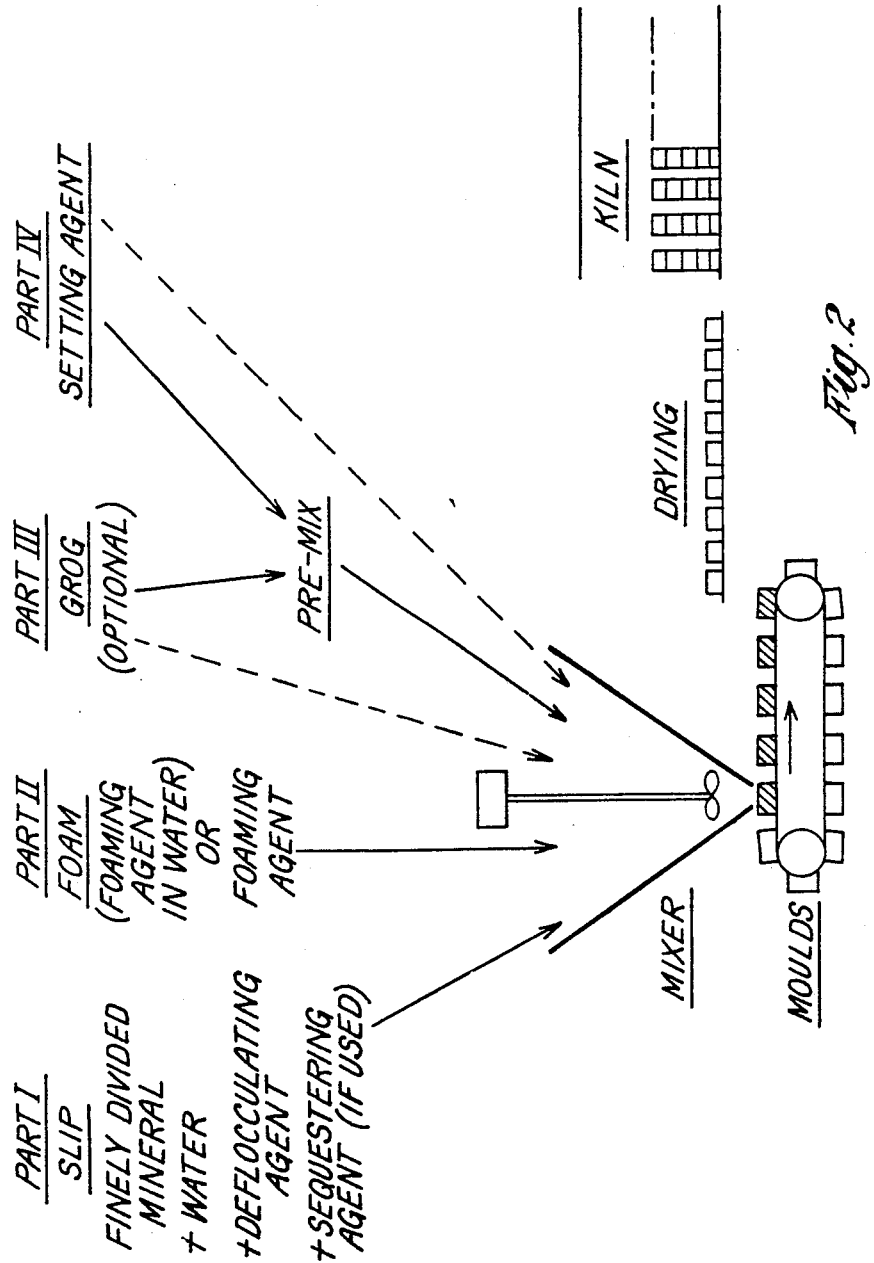

United States Patent Office 3,232,772
Patented Feb. 1, 1966

3,232,772
REFRACTORY PRODUCTS AND THE
PRODUCTION THEREOF
Raymond Frederick Hilton, Redhill, Surrey, William John Steen, Neston, and Brian Charles Hilton Steele, London, England, assignors to Morgan Refractories Limited, Cheshire, England
Filed May 1, 1963, Ser. No. 277,247
Claims priority, application Great Britain, May 4, 1962, 17,313/62
8 Claims. (Cl. 106—40)

This invention relates to refractory products by which is meant heat-insulating materials or articles, known generally as "refractories," which will withstand high temperature, for example firebricks which are used for such purposes as lining furnaces.

The object of the invention is to provide refractory products with an improved finely cellular or porous structure.

Refractory products with which the invention is concerned are made from an aqueous suspension of mineral particles, the mineral most commonly used being clay, either alone or mixed with other minerals, but minerals or mixtures of minerals other than clay can be used. Such a suspension is known in the refractories art as "slip" and in this specification the term "slip" will be used to define an aqueous suspension of particles of any mineral or mixture of minerals.

It is known to produce porous refractory products from slip in which is incorporated combustible material, such as sawdust, which becomes burnt and leaves cavities when the products are, as usual, fired in a kiln.

It is difficult to effect complete combustion and to control or predict the shape, size and distribution of cavities produced by burning out combustible material, this method usually producing an irregular porous structure which provides only to a limited extent the properties of sufficient mechanical strength with low thermal conductivity and heat capacity required in light-weight insulating refractories such as firebricks for lining furnaces.

It is also known to make porous refractories from foamed slip, the foam being formed by mechanical aeration or chemical evolution of gas in the slip, and this method does enable a substantially spherically porous structure to be produced.

We have found that porous refractories made from foamed slip have surprisingly high mechanical strength, for a given weight, low thermal conductivity and low heat capacity if they have a total pore volume and pore size, and preferably also a pore size range and distribution, within certain limits.

According to the present invention therefore, in a fired refractory product made from foamed slip and having a porous structure with substantially spherical pores, the substantially spherical pores have a diameter not greater than 500 microns and the total pore volume is between 55% and 90%, inclusive, of the whole volume of the product.

In considering maximum pore diameter, it is reasonable to disregard the possible presence of a few pores of larger size, perhaps formed by coalescence of two or more bubbles in the foam or some slight irregularity in the constituents of the slip.

Preferably, the diameter of the majority of the pores is substantially less than 500 microns and, in particular, the diameter of pores forming at least 70% of the total pore volume is less than 200 microns.

The following table gives characteristic limits of the pore size distribution for a preferred range of products in accordance with the invention:

| Pore diameter, in microns | Distribution of pore diameters at limits, expressed as percentages of total pore volume | |
|---|---|---|
| | A | B |
| Less Than: | | |
| 200 | 70 | 100 |
| 100 | 37 | 78 |
| 70 | 25 | 70 |
| 40 | 10 | 60 |
| 20 | 5 | 55 |
| 10 | 0 | 50 |

The above table is shown graphically by FIG. 1 of the accompanying drawings in which the curves A and B connect the limits listed under A and B in the table.

In FIG. 1, the horizontal axis X has a logarithmic scale for "Maximum Pore Diameter" in microns and the vertical axis Y has a scale for "Percentage of Total Pore Volume."

For any refractory product within the preferred range, the pore size distribution may follow a curve, such as C, which has substantially the same shape as the curves A and B and the ratio of AC to CB may be substantially constant.

The properties of any particular refractory product will depend upon whether its pore size distribution curve is nearer to A or to B and can be selected to suit requirements. A product with a pore size distribution close to curve A will have a lower strength but a better resistance to thermal shock, i.e. sudden change of temperature, than a product with a pore size distribution nearer to curve B.

The refractory products of the invention can be made from slip of any granular or powdery mineral, or a mixture of minerals of which the refractory value, either in the natural state or pre-calcined, has a "Pyrometric Cone Equivalent" greater than British Pyrometric Cone No. 1. Such pyrometric cones are made by Harrison & Son (Hanley) Ltd., in England, and they are used in accordance with British Standard Specification 1902:1952, "The Determination of Refractories," Standard Test No. 5.

Examples of suitable materials are clay, sillimanite, kyanite, bauxite, carbon, as graphite or otherwise, and refractory oxides, carbides and nitrides. Also, materials normally regarded as waste products, such as ash from power station boilers, may be used, alone or mixed with materials such as the examples given, provided that the above requirement for refractory value is met. If a mineral used is one which is attacked by oxygen, for example carbon, graphite or silicon carbide, the above-mentioned Standard Test No. 5 must be modified by conducting it in a non-oxiding atmosphere.

There may be used for the slip, or added to a slip made from any of the materials of which examples are given above, or to a mixture thereof, a material, known in the refractories art as "grog," which is an inert, non-hydrophylic, refractory filler such as crushed and ground waste from the refractory end-product itself.

The particle size of the material used for slip is preferably finer than a mesh size of ⅛ inch (3.175 mm.).

The present invention also provides a new process for making, from foamed slip, porous refractory products having a porous structure as described above.

The process according to the invention broadly comprises preparing a stable fluid slip forming the slip into a foam and adding a slow or delayed action setting agent which after the foamed slip has been poured into a mould, causes flocculation of the slip to a set cellular form which is then dried and fired.

In the process outlined above, an important feature of the invention is the selection and use of a setting agent which acts at a sufficiently slow rate, or has a delayed action, so that the slip remains fluid enough to be poured into the mould but then sets in time for the cellular structure of the foam to be preserved and for the set form to be removed from the mould, for drying and subsequent firing, without such delay as would interfere with the economic utilisation of moulds in large-quantity production.

Further details of the setting agent and other features of the process according to the invention will be given with reference to a diagram which is FIG. 2 of the accompanying drawings.

In FIG. 2, the materials used in the process are set out under headings as Parts I, II, III and IV and the mixing and other process steps are shown by arrows of which those in broken lines indicate alternatives.

Dealing now with the several headings:

PART I

Finely divided clay or other mineral, of which examples are given earlier in this specification, is mixed with water and deflocculated in a manner well known in the art. Typical deflocculating agents are sodium silicate, sodium carbonate and sodium hexametaphosphate.

The object is to reduce the amount of water required to give a fluid slip which, after mixing with Parts II, III and IV, is still just pourable. Preferably the slip is adjusted to give the requisite fluidity with the minimum water content.

The sequestering agent may be used to control the setting, as explained below.

PART II

Preferably foam is separately prepared by any suitable aeration method. The amount of aeration or expansion of the foam is not critical. However, if it is over-expanded, its stability is reduced and it may tend to break down when mixed with the other ingredients. The expansion of the original volume of water used for the foam should preferably not exceed 10 times but may be as much as 20 times.

Any foaming agent may be used provided that it gives the requisite expansion and the foam is sufficiently stable so that it does not break down when mixed with the other ingredients.

If desired, a stabilizing agent may be added to the foam to prevent it breaking down e.g. sodium alginate, gum, gelatine.

PART III

It is possible to make the slip (Part I) from material which could be defined as grog but in other, and probably more usual, cases a proportion of grog is added to the slip and foam. The particle size of added grog should be finer than a mesh size of ⅛ inch (3.175 mm.).

PART IV

The eventual function of the setting agent is to increase the viscosity of the slip so that it ceases to flow but it must do this either with delayed action or at a controlled rate so that it is sufficiently delayed to allow the slip to be poured into a mould. It must however act in time to allow the moulded form to be released from the mould in a reasonable time for economic utilisation of moulds.

The setting agent may comprise any of the following:

(1) A material which slowly releases ions which flocculate the slip e.g. diethyl sulphate.

(2) A material which is modified to give a slow release of ions e.g. plaster of Paris or cement, coated with a water miscible oil.

(3) A material, such as calcium aluminate cement, which releases flocculating ions at a moderate rate. This may be used when a sequestering agent has been added to the slip. The sequestering agent is a material which has the property of absorbing ions. Cement added to the slip would release calcium ions and cause immediate setting but the presence of a sequestering agent, e.g. sodium tripolyphosphate, has the effect of preferentially absorbing the calcium ions as they are released from the cement. Setting does not start to take place until the sequestering agent has reached its limit of absorption of the ions. Thus, the delay time can be controlled by adjusting the amount of sequestering agent used. Sodium tripolyphosphate can serve the dual purpose of a deflocculating as well as a sequestering agent.

Of the foregoing, it is to be noted that in some instances, the flocculating agent is rapid-acting by itself and its action is delayed or inhibited, according to the invention, by the presence of an inhibitor such as a sequestering agent or a water-miscible oil coating. The diethyl sulfate may have its own "built in" inhibition system based on hydrolysis. However, it may be appropriate to consider this agent separately from the rapidly acting agent plus inhibitor combination.

In alternative ways of carrying out the process, Parts III and IV can advantageously be premixed, particularly if the setting agent is a powder. This ensures rapid and even distribution of the setting agent in the slip.

Parts I, II and III can be premixed before foaming, if desired.

If desired a small amount, say 5% by weight, of a combustible material, such as sawdust or waste paper, in a granular or fibrous form may be present in the slip in Part I, such a small proportion of combustible material not being sufficient to spoil the final product.

The process can conveniently be carried out using a hopper mixing apparatus into which the Parts I, II, III and IV are fed simultaneously, with control of rate and proportions, and which discharges into moulds travelling below the hopper. Whether or not premixing without formation of foam is effected, the hopper or equivalent apparatus may include aerating means for forming the foam.

The foamed mixture sets in the moulds into forms which can be handled sufficiently for removal from the moulds and drying, stacking and firing such as in a travelling type kiln.

The invention is particularly advantageous for the large quantity production of light-weight insulating firebricks, such as for furnace linings, but is also applicable to other refractories.

It is recognised in the art of making refractories that precise specifications and processes cannot be stipulated in advance because adjustments must always be made for the raw materials available and even for variation between batches or deliveries of nominally identical materials. In carrying out the present invention therefore, the usual practice of adjustment for available materials and conditions should be followed.

Also, for control of the pore size and distribution in products made by the process described, hard and fast rules cannot be given but in general it will be found that pore size can be controlled by selecting or adjusting the viscosity of the slip; the higher the viscosity of the slip the larger the average pore size. The total pore volume and pore distribution depend upon the amount of foam or foaming agent employed and the efficiency of mixing.

The following is an example of manufacture of refractory bricks in accordance with the invention, quantities being stated in parts by weight:

Prepare a solution of:

| | Parts |
|---|---|
| Water | 45 |
| Sodium silicate liquid | 1.5 |

The sodium silicate liquid should be of 100° Twaddell=specific gravity 1.5 and is a deflocculating agent.

The above solution is slowly added to:

Ground fireclay—100 parts and thoroughly mixed until a slip of uniform consistency is obtained.

The fireclay should be ground fine enough to pass through a sieve of 200 mesh B.S.S. (British Standard Specification) which has an aperture size of 76 microns. The fireclay used in this example is from Shropshire in England.

Slip prepared as above described is used as Part I in accordance with FIG. 2.

For Part II there is used as a foaming agent:

Sodium dodecyl benzene sulphonate—1.5 parts (27% active solution), and the mixture is vigorously whipped until its volume has increased to three times its original volume.

For Part IV there is used a setting agent of the first kind mentioned above, namely:

Diethyl sulphate—2.5 parts which is added to the foamed slip, the whole stirred for 30 seconds and then immediately discharged into brick moulds.

The mixture is allowed to set in the moulds and the shaped products so formed are then removed from the moulds, stacked for air-drying and then fired in a kiln to 1400° C. in accordance with methods well known for making refractory bricks. As is usual, the brick moulds are of larger size than the bricks required, the bricks as fired being ground to required size and shape.

Bricks produced in accordance with the above example have a pore size distribution with a curve lying approximately midway between curves A and C on FIG. 1.

We claim:

1. A fired refractory product made from a foamed slip of refractory mineral particles having a porous structure of at least substantially spherical pores in a proportion of from 55 to 90% inclusive of the whole volume of the product, said pores having a diameter not greater than 500 microns, from 70 to 100% of the total pore volume being constituted by pores having a diameter of less than 200 microns, from 37 to 78% of the total pore volume being constituted by pores having a diameter of less than 100 microns, from 25 to 70% of the total pore volume being constituted by pores having a diameter of less than 70 microns, from 10 to 60% of the total pore volume being constituted by pores having a diameter of less than 40 microns, from 5 to 55% of the total pore volume being constituted by pores having a diameter of less than 20 microns, and from 0 to 50% of the total pore volume being constituted by pores having a diameter of less than 10 microns.

2. A fired refractory product according to claim 1 wherein the mineral comprises at least one selected from the group consisting of clay, sillimanite, kyanite, bauxite, carbon, refractory oxides, carbides, nitrides, and ash.

3. A fired refractory product according to claim 1 wherein the mineral comprises clay.

4. A method for making a porous refractory product comprising the steps of forming a stable fluid slip of refractory mineral particles, forming said stable fluid slip into a foam, adding a flocculating setting agent to said foamed slip in the presence of an inhibitor which prevents flocculation for a time interval, pouring said slip into a mold during said time interval prior to the onset of flocculating setting action induced by said agent, allowing the slip to set in the mold to a set form, removing the set form from the mold, and drying and firing the set form to produce said refractory product.

5. A method according to claim 4 wherein the flocculating setting agent comprises particles of at least one material selected from the group of plaster of Paris and cement and wherein the inhibitor is water-miscible oil coated on the particles.

6. A method according to claim 4 wherein the flocculating setting agent is a calcium cement and the inhibitor is a sequestering agent dispersed in the slip.

7. A method according to claim 6 wherein the sequestering agent is sodium tripolyphosphate and the cement is a calcium aluminate cement.

8. A method for making a porous refractory product comprising the steps of forming a stable fluid slip of refractory mineral particles, forming said stable fluid slip into a foam, adding diethyl sulfate to the foamed slip, pouring said slip into a mold, allowing the slip to set in the mold to a set form, removing the set form from the mold, and drying and firing the set form to produce said refractory product.

References Cited by the Examiner

UNITED STATES PATENTS

| | | | |
|---|---|---|---|
| 1,897,667 | 2/1933 | Husain et al. | 106—40 |
| 1,925,058 | 8/1933 | Rowland et al. | 106—72 |
| 1,944,007 | 1/1934 | Hobart | 106—40 |
| 1,998,686 | 4/1935 | Parsons | 106—40 |
| 2,151,932 | 3/1939 | Nielson | 106—40 |
| 2,337,597 | 12/1943 | Hall | 106—72 |
| 2,521,128 | 9/1950 | Ramsay | 106—72 |
| 2,702,753 | 2/1955 | Dickey | 105—88 |

FOREIGN PATENTS

| | | |
|---|---|---|
| 628,725 | 10/1961 | Canada. |
| 653,264 | 12/1962 | Canada. |

OTHER REFERENCES

Ser. No. 325,908, Huttemann (A.P.C.), published June 1, 1943.

TOBIAS E. LEVOW, *Primary Examiner*.